US012581235B2

(12) United States Patent
Lee et al.

(10) Patent No.: US 12,581,235 B2
(45) Date of Patent: Mar. 17, 2026

(54) NOISE REDUCTION SYSTEM USING FINITE IMPULSE RESPONSE FILTER THAT IS UPDATED BY CONFIGURATION OF MINIMUM PHASE FILTER FOR NOISE REDUCTION AND ASSOCIATED METHOD

(71) Applicant: Airoha Technology Corp., Hsinchu City (TW)

(72) Inventors: Tsung-Han Lee, Changhua County (TW); Chien-Chieh Wang, Hsinchu City (TW)

(73) Assignee: Airoha Technology Corp., Hsinchu City (TW)

( * ) Notice: Subject to any disclaimer, the term of this patent is extended or adjusted under 35 U.S.C. 154(b) by 221 days.

(21) Appl. No.: 18/408,532

(22) Filed: Jan. 9, 2024

(65) Prior Publication Data

US 2024/0406626 A1 Dec. 5, 2024

Related U.S. Application Data

(60) Provisional application No. 63/470,185, filed on Jun. 1, 2023.

(51) Int. Cl.
*H04R 3/02* (2006.01)

(52) U.S. Cl.
CPC .................................... *H04R 3/02* (2013.01)

(58) Field of Classification Search
CPC ........................................................ H04R 3/02
See application file for complete search history.

(56) References Cited

U.S. PATENT DOCUMENTS 6,590,932 B1 7/2003 Hui
11,393,486 B1 * 7/2022 Woodruff ............ G10L 21/0232

FOREIGN PATENT DOCUMENTS

WO WO-2018141559 A1 * 8/2018 ........... H04R 25/505

* cited by examiner

*Primary Examiner* — Andrew Sniezek
(74) *Attorney, Agent, or Firm* — Winston Hsu

(57) ABSTRACT

A noise reduction (NR) system includes a finite impulse response (FIR) filter and a filter manager circuit. The FIR filter is used to perform NR upon a filter input derived from an input signal. The filter manager circuit is used to determine a configuration of a minimum phase filter according to the input signal, and update the FIR filter by the configuration of the minimum phase filter.

14 Claims, 9 Drawing Sheets

NOISE REDUCTION SYSTEM USING FINITE IMPULSE RESPONSE FILTER THAT IS UPDATED BY CONFIGURATION OF MINIMUM PHASE FILTER FOR NOISE REDUCTION AND ASSOCIATED METHOD

CROSS REFERENCE TO RELATED APPLICATIONS

This application claims the benefit of U.S. Provisional Application No. 63/470,185, filed on Jun. 1, 2023. The content of the application is incorporated herein by reference.

BACKGROUND OF THE INVENTION

1. Field of the Invention

The present invention relates to an audio processing technique, and more particularly, to a noise reduction system using a finite impulse response filter that is updated by a configuration of a minimum phase filter for noise reduction and an associated method.

2. Description of the Prior Art

Noise reduction (NR) is a critical technique for audio applications since it increases intelligibility of daily conversion and boosts performance of speech recognition and coding systems. Generally, NR can be designed in the time domain, the frequency domain, or both. The frequency-domain approaches enable finer shaping on frequency bands (i.e., better noise suppression) at the cost of the latency that depends on the hop-size of the time-frequency analysis. The time-domain approaches usually come with the use of a linear phase filter. However, the problem with the linear phase filter is that the delay can be too large. For example, the delay of a linear phase filter is equal to N/2, where Nis the length of the filter. According to subjective experimental results, the comb filtering effect is audible when the delay introduced by NR goes over 0.5 milisecond (ms), which degrades the audio quality significantly. Hence, regarding those applications requiring natural listening experience, an ultra-low-latency NR system is desirable to reduce the comb filtering effect for enriching sense of hearing.

SUMMARY OF THE INVENTION

One of the objectives of the claimed invention is to provide a noise reduction system using a finite impulse response filter that is updated by a configuration of a minimum phase filter for noise reduction and an associated method.

According to a first aspect of the present invention, an exemplary noise reduction (NR) system is disclosed. The exemplary NR system includes a finite impulse response (FIR) filter and a filter manager circuit. The FIR filter is arranged to perform NR upon a filter input derived from an input signal. The filter manager circuit is arranged to determine a configuration of a minimum phase filter according to the input signal, and update the FIR filter by the configuration of the minimum phase filter.

According to a second aspect of the present invention, an exemplary noise reduction (NR) method is disclosed. The exemplary NR method includes: performing, by a finite impulse response (FIR) filter, NR upon an input signal; determining a configuration of a minimum phase filter according to the input signal; and updating the FIR filter by the configuration of the minimum phase filter.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
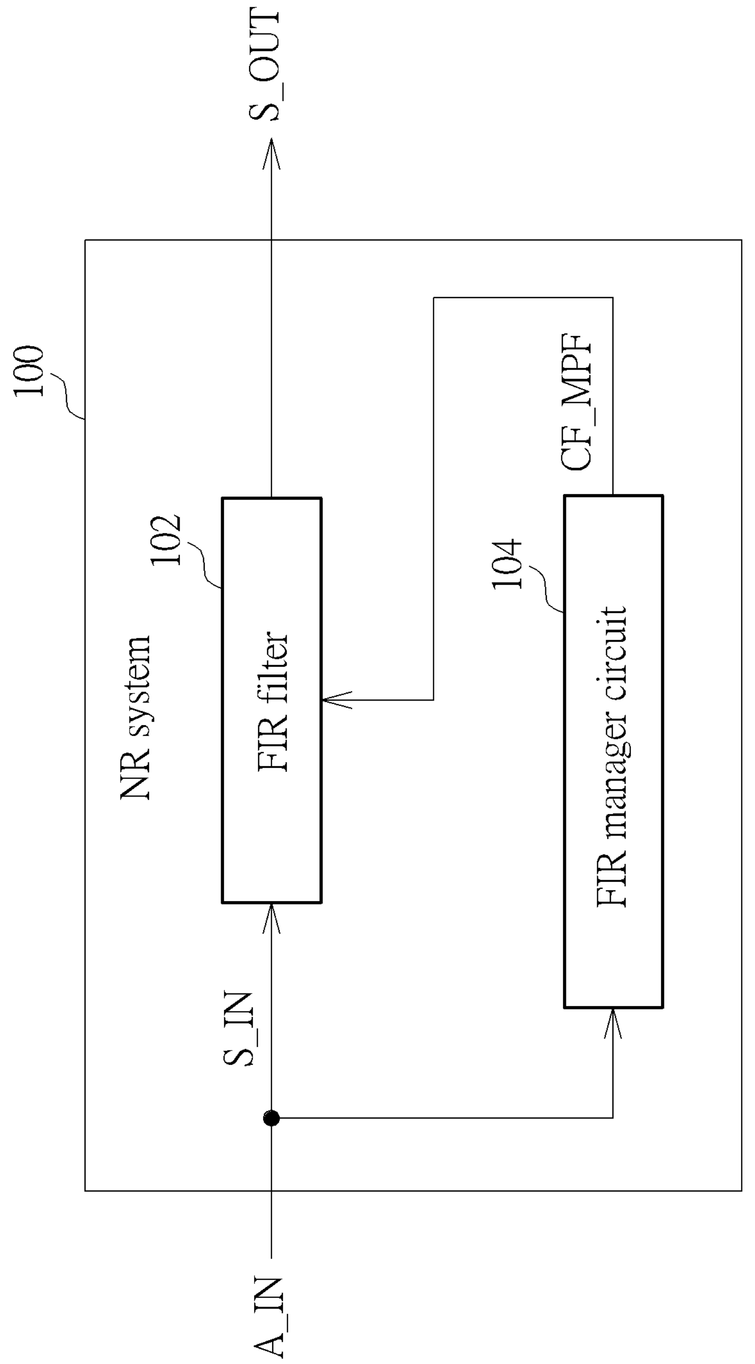
FIG. 1 is a diagram illustrating a noise reduction (NR) system according to an embodiment of the present invention.

FIG. 1 is a diagram illustrating a noise reduction (NR) system according to an embodiment of the present invention. The NR system 100 can be employed by an audio application. In this embodiment, the NR system 100 includes a finite impulse response (FIR) filter 102 and a filter manager circuit 104. The FIR filter 102 is arranged to perform NR upon a filter input S_IN derived from an input signal A_IN to generate a filter output S_OUT. That is, the filter input S_IN may be the same as the input signal A_IN, or may be a processing result of the input signal A_IN. In some embodiments of the present invention, the terms "filter input" and "input signal" may be interchangeable.

For example, the input signal A_IN may be an audio signal picked up by a microphone. The filter manager circuit 104 is arranged to determine a configuration CF_MPF of a minimum phase filter according to the input signal A_IN, and update the FIR filter 102 by the configuration CF_MPF of the minimum phase filter. For example, the configuration CF_MPF includes filter coefficients of the minimum phase filter, such that the FIR filter 102 is configured by the filter coefficients specified by the configuration CF_MPF to act as a minimum phase FIR filter. A person skilled in the pertinent art should readily appreciate that a minimum phase filter has all poles and all zeros within or on the unit circle.

Compared to an FIR filter, an infinite impulse response (IIR) filter may be unstable. Since stability is a crucial factor of NR, the present invention proposes using the FIR filter 102 to realize the NR function, thereby benefiting from advantages possessed by the FIR filter 102. Furthermore, since NR is performed by the FIR filter 102 that is configured to act as a minimum phase filter, the NR can benefit from an inherent low-latency feature of the minimum phase filter. To put it simply, NR latency can be reduced by the use of a minimum phase filter.

An FIR filter may be implemented using a hardware approach or a software approach. The hardware approach is more attractive than the software one due to the fact that there is less system limitation. For example, the limitation of interrupt frequency may cause corresponding buffering delay. In some embodiments of the present invention, the FIR filter 102 is implemented using a hardware filter to reduce the system overhead. To put it simply, NR latency can be further reduced by the use of the FIR filter 102 that is implemented using the hardware approach. The comparison between delay time of different NR system designs under 50K sampling rate and 50-tap FIR filter is illustrated in the following table.

TABLE 1

| | EQ (IIR) + Other System | NR (FIR) | System Over-head | Total |
|---|---|---|---|---|
| Software Linear Phase System | 4 | 25 | 48 | 77 |
| Software Minimum Phase System | 4 | 2 | 48 | 54 |
| Hardware Linear Phase System | 4 | 25 | 0 | 29 |
| Hardware Minimum Phase System (Preferred Embodiment of Present Invention) | 4 | 2 | 0 | 6 |

Figure 2:
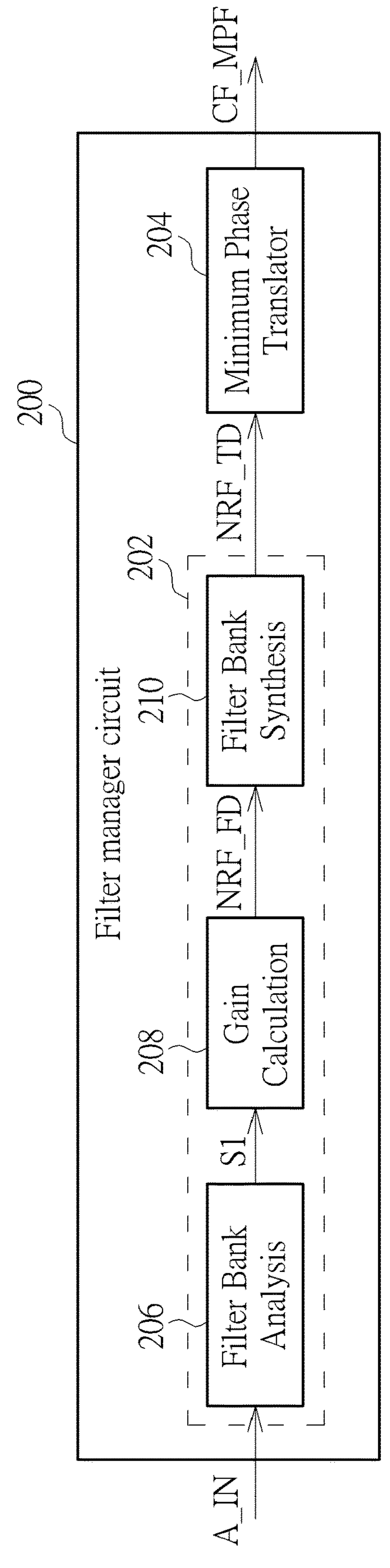
FIG. 2 is a diagram illustrating one filter manager circuit according to an embodiment of the present invention.

As mentioned above, the filter manager circuit 104 is arranged to determine the configuration CF_MPF of the minimum phase filter according to the input signal A_IN. FIG. 2 is a diagram illustrating one filter manager circuit according to an embodiment of the present invention. The filter manager circuit 104 shown in FIG. 1 may be implemented using the filter manager circuit 200. As shown in FIG. 2, the filter manager circuit 200 includes an NR filter estimation circuit 202 and a minimum phase translator circuit (labeled by "minimum phase translator") 204. The NR filter estimation circuit 202 is arranged to estimate an NR prototype filter according to the input signal A_IN. In this embodiment, the NR prototype filter is a time-domain NR prototype filter NRF_TD. For example, the NR filter estimation circuit 202 may employ a homomorphic filtering technique for signal analysis. As shown in FIG. 2, the NR filter estimation circuit 202 includes a filter bank analysis circuit (labeled by "filter bank analysis") 206, a gain calculation circuit (labeled by "gain calculation") 208, and a filter bank synthesis circuit (labeled by "filter bank synthesis") 210. The filter bank analysis circuit 206 is arranged to perform filter bank analysis that converts the input signal A_IN from a time domain to a frequency domain, such that signal components of different frequency bands are extracted from the input signal A_IN for follow-up signal analysis. The gain calculation circuit 208 is arranged to generate a frequency-domain NR prototype filter NRF_FD by estimating background noise statistics and computing weights of the frequency bands according to an output S1 of the filter bank analysis circuit 206. The filter bank synthesis circuit 210 is arranged to perform filter bank synthesis that converts the frequency-domain NR prototype filter NRF_FD into the time-domain NR prototype filter NRF_TD.

Figure 3:
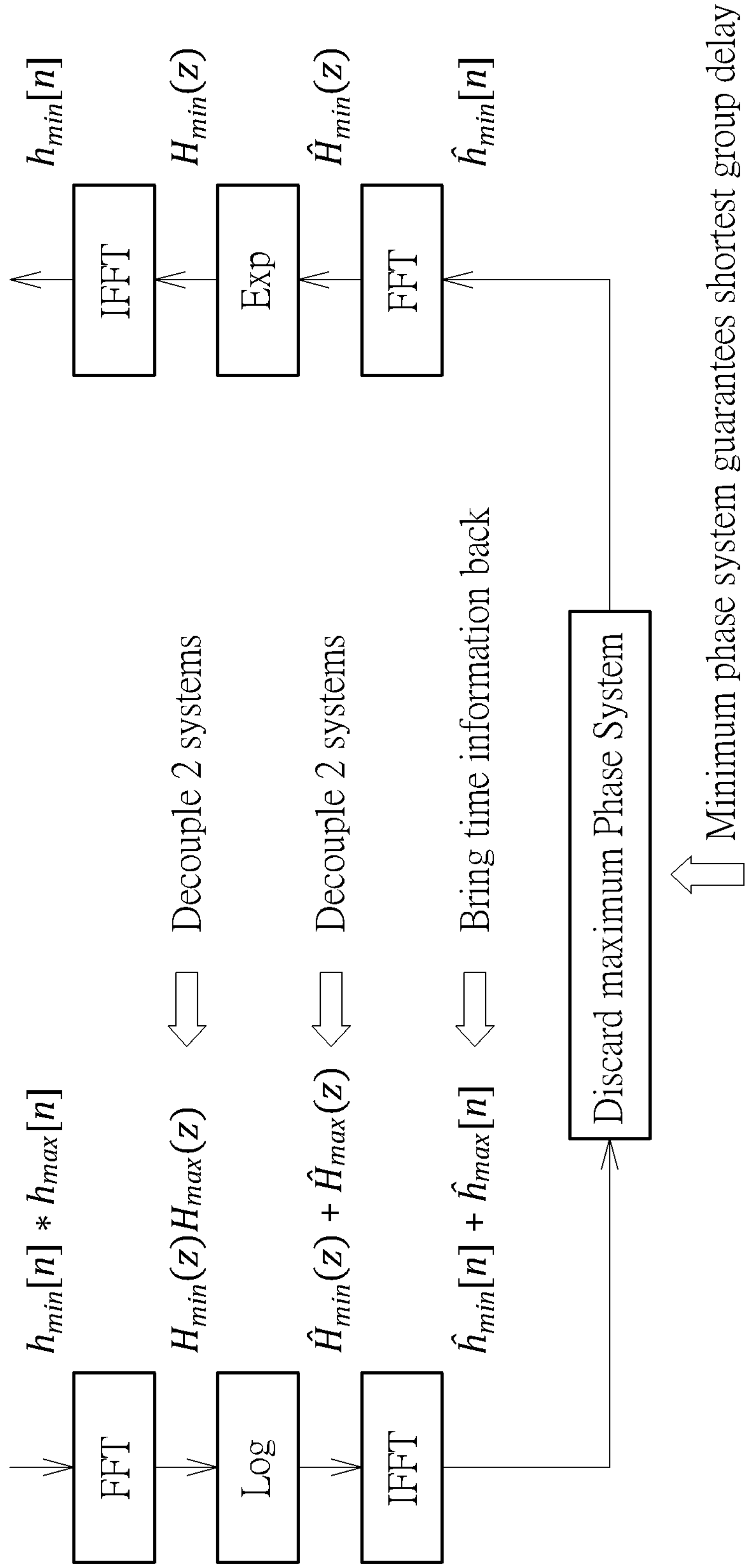
FIG. 3 is a diagram illustrating a minimum phase translation operation performed at a minimum phase translator circuit according to an embodiment of the present invention.

The minimum phase translator circuit 204 is arranged to approach an NR prototype filter (e.g., time-domain NR prototype filter NRF_TD) in a minimum phase manner, and generate the configuration CF_MPF of the minimum phase filter as an output of the minimum phase translator circuit 204. FIG. 3 is a diagram illustrating a minimum phase translation operation performed at the minimum phase translator circuit 204 according to an embodiment of the present invention. The time-domain NR prototype filter NRF_TD may be regarded as a combination of a maximum phase system with a response $h_{max}[n]$ and a minimum phase system with a response $h_{min}[n]$. The minimum phase translation operation is performed to decompose the time-domain NR prototype filter NRF_TD into the maximum phase system and the minimum phase system, and discard the maximum phase system to generate an output of the minimum phase translation operation. Specifically, the configuration CF_MPF of the minimum phase filter corresponds to the response $h_{min}[n]$ obtained by the minimum phase translation operation. In this embodiment, the minimum phase translation operation involves several signal processing, including Fast Fourier Transform (FFT), Logarithm (Log), Inverse FFT (IFFT), and Exponentiation (Exp). However, this is for illustrative purposes only, and is not meant to be a limitation of the present invention. In practice, any means capable of determining a minimum phase filter with a response that approaches a response of an NR prototype filter can be employed by the minimum phase translator circuit 204. That is, the present invention has no limitations on the implementation of the minimum phase translator circuit 204.

Figure 4:
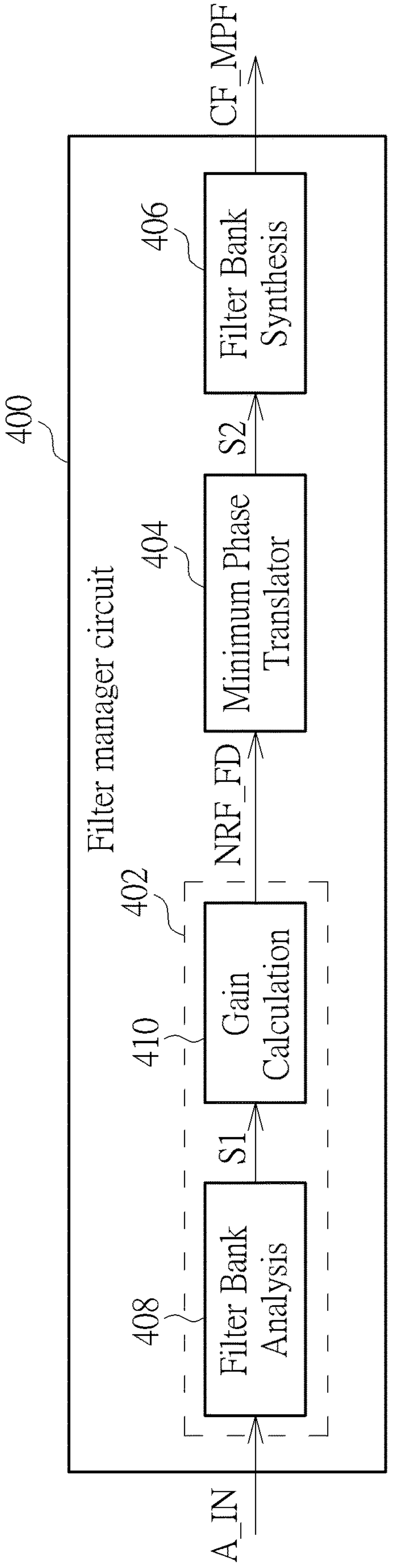
FIG. 4 is a diagram illustrating another filter manager circuit according to an embodiment of the present invention.

In the embodiment shown in FIG. 2, the minimum phase translation operation performed by the minimum phase translator circuit 204 is a part of procedures in the time domain. Alternatively, a minimum phase translator circuit may be arranged to perform a minimum phase translation operation in the frequency domain. FIG. 4 is a diagram illustrating another filter manager circuit according to an embodiment of the present invention. The filter manager circuit 104 shown in FIG. 1 may be implemented using the filter manager circuit 400. As shown in FIG. 4, the filter manager circuit 400 includes an NR filter estimation circuit 402, a minimum phase translator circuit (labeled by "minimum phase translator") 404, and a filter bank synthesis circuit (labeled by "filter bank synthesis") 406. The NR filter estimation circuit 402 is arranged to estimate an NR prototype filter according to the input signal A_IN. In this embodiment, the NR prototype filter is a frequency-domain NR prototype filter NRF_FD. For example, the NR filter estimation circuit 402 may employ a homomorphic filtering technique for signal analysis. As shown in FIG. 4, the NR filter estimation circuit 402 includes a filter bank analysis circuit (labeled by "filter bank analysis") 408 and a gain calculation circuit (labeled by "gain calculation") 410. The filter bank analysis circuit 408 is arranged to perform filter bank analysis that converts the input signal A_IN from a time domain to a frequency domain, such that signal components of different frequency bands are extracted from the input signal A_IN for follow-up signal analysis. The gain calculation circuit 410 is arranged to generate the frequency-domain NR prototype filter NRF_FD by estimating background noise statistics and computing weights of the frequency bands according to an output S1 of the filter bank analysis circuit 408. The minimum phase translator circuit 404 is arranged to approach an NR prototype filter (e.g., frequency-domain NR prototype filter NRF_FD) in a minimum phase manner. The configuration CF_MPF of the minimum phase filter is derived from an output S2 of the minimum phase translator circuit 404. Hence, the filter bank synthesis circuit 406 is arranged to perform filter bank synthesis that converts the output S2 of the minimum phase translator circuit 404 from the frequency domain into the time domain. It should be noted that any means capable of determining a minimum phase filter with a response that approaches a response of an NR prototype filter can be employed by the minimum phase translator circuit 404.

Since the NR system 100 is an ultra-low-latency NR system, the NR system 100 can be employed by a variety of audio applications for achieving better audio quality. For example, the NR system 100 may be included in a true wireless headset, a hearing aids (HA) device, a personal sound amplification product (PSAP), a wireless microphone, or a sidetone circuit.

Figure 5:
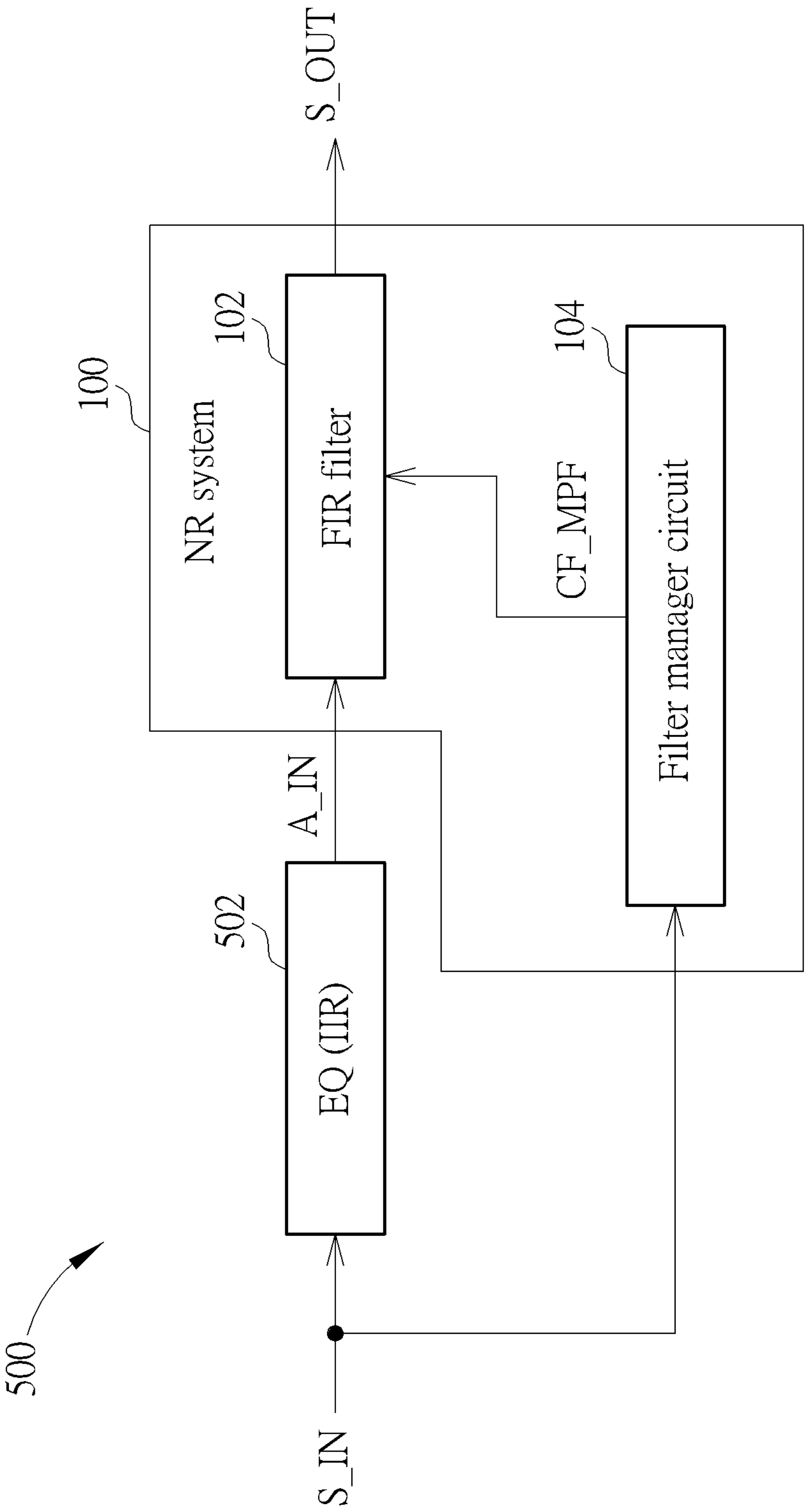
FIG. 5 is a diagram illustrating one true wireless headset using the NR system shown in FIG. 1 according to an embodiment of the present invention.

FIG. 5 is a diagram illustrating one true wireless headset using the NR system 100 according to an embodiment of the present invention. When a passthrough mode of the true wireless headset 500 is selected by the user, the NR system 100 and an equalizer (EQ) 502 are both enabled. In this embodiment, the EQ 502 may be implemented using an IIR filter, and an EQ output acts as the filter input of the FIR filter 102. Hence, the true wireless headset 500 can take advantages of inherent characteristics of the IIR filter and the FIR filter to achieve optimized performance. The EQ 502 (which is implemented by an IIR filter) can efficiently finish frequency response compensation and can be able to adjust in various scenarios with the help of poles. Since noise varies with time, an output of the NR filter (which is implemented by an FIR filter) would be much more stable. It should be noted that positions of NR and EQ may be interchangeable.

Figure 6:
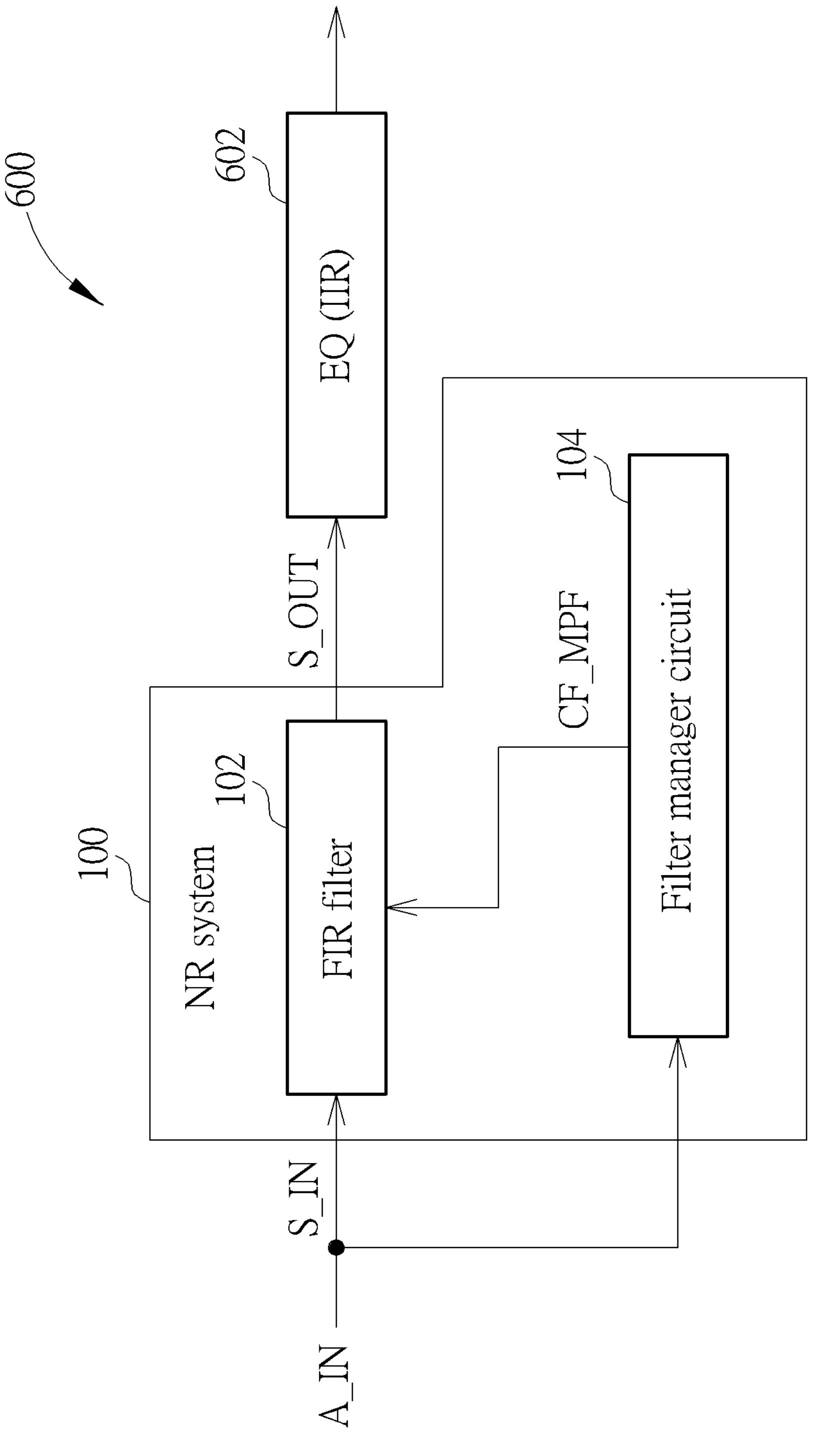
FIG. 6 is a diagram illustrating another true wireless headset using the NR system shown in FIG. 1 according to an embodiment of the present invention.

FIG. 6 is a diagram illustrating another true wireless headset using the NR system 100 according to an embodiment of the present invention. When a passthrough mode of the true wireless headset 600 is selected by the user, the NR system 100 and an equalizer (EQ) 602 are both enabled. In this embodiment, the EQ 602 may be implemented using an IIR filter, and the filter output S_OUT of the FIR filter 102 acts as an EQ input.

Figure 7:
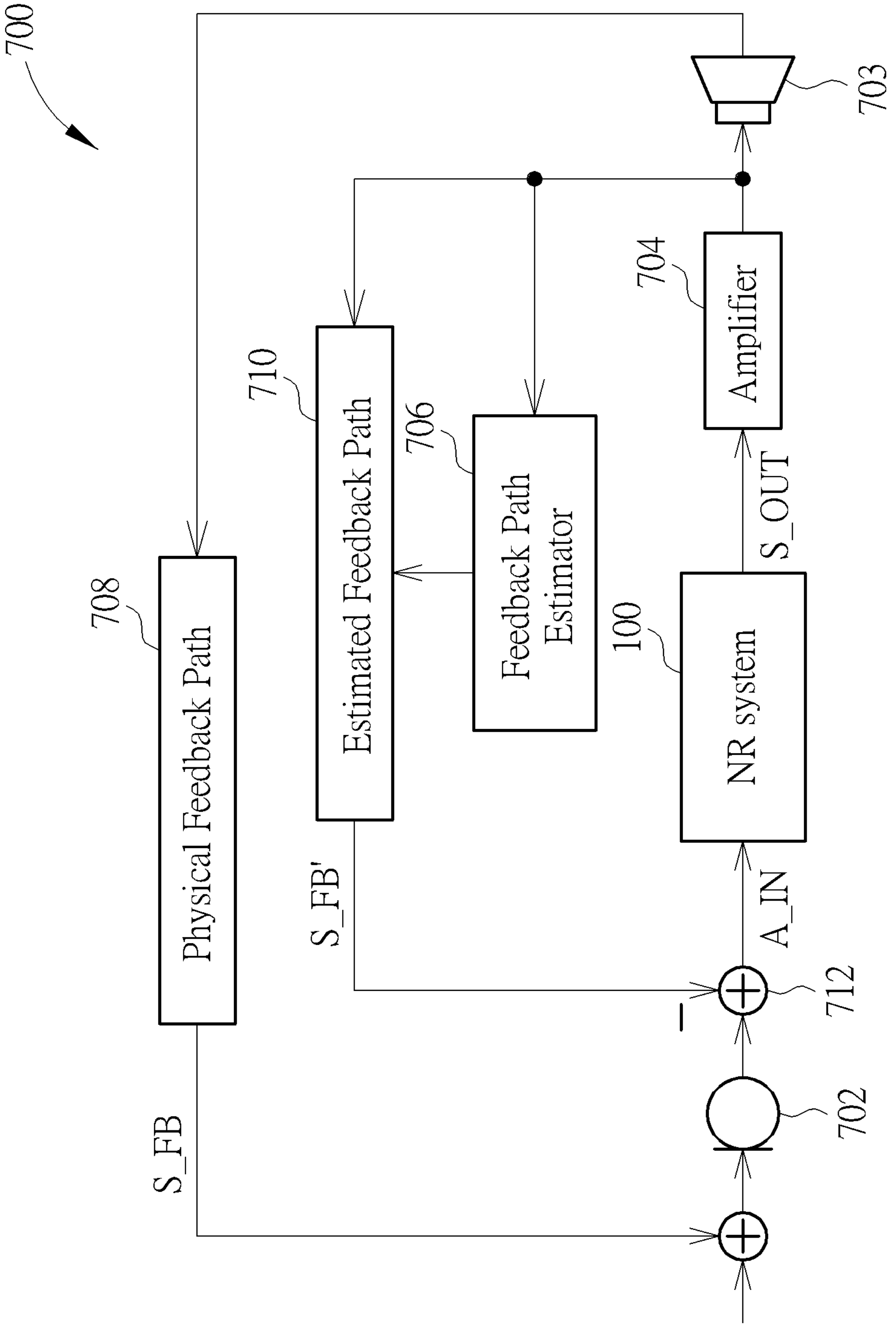
FIG. 7 is a diagram illustrating an HA device (or PSAP) using the NR system shown in FIG. 1 according to an embodiment of the present invention.

FIG. 7 is a diagram illustrating an HA device (or PSAP) using the NR system 100 according to an embodiment of the present invention. The HA device (or PSAP) 700 includes the NR system 100, a microphone 702, a speaker 703, an amplifier 704, a feedback path estimator 706, and a combining circuit 712. A feedback signal S_FB is originated from the speaker 703 and fed back to an input of the microphone 702 via a physical feedback path 708. The feedback path estimator 706 is arranged to generate an estimated feedback signal S_FB' that is fed back to an output of the microphone 702 via an estimated feedback path 710. The estimated feedback signal S_FB' is supplied to the combining circuit (e.g., a subtractor) 712, and is intended to cancel the feedback signal S_FB picked up by the microphone 702. The NR system 100 is used to perform NR upon the output of the microphone 702 to enhance the audio quality.

Figure 8:
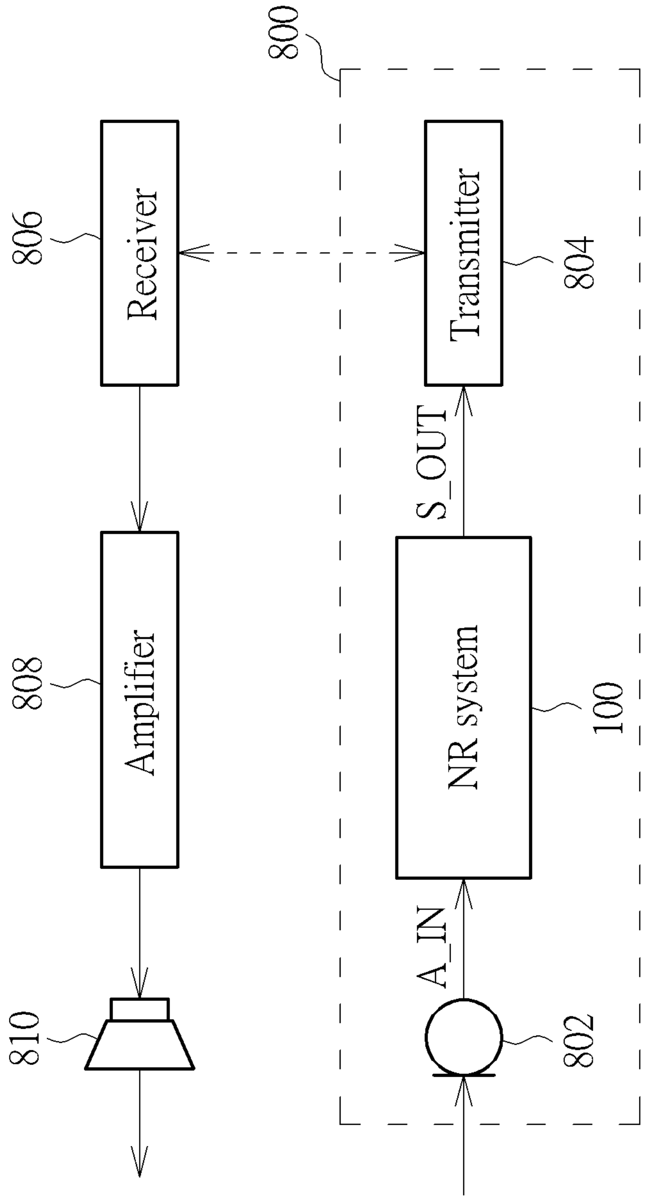
FIG. 8 is a diagram illustrating a wireless microphone using the NR system shown in FIG. 1 according to an embodiment of the present invention.

FIG. 8 is a diagram illustrating a wireless microphone using the NR system 100 according to an embodiment of the present invention. The wireless microphone 800 includes the NR system 100, a microphone 802, and a transmitter 804. The NR system 100 is used to perform NR upon the output of the microphone 802 to enhance the audio quality. The filter output S_OUT is wirelessly transmitted to a receiver 806, amplified by the amplifier 808, and played via a speaker 810.

Figure 9:
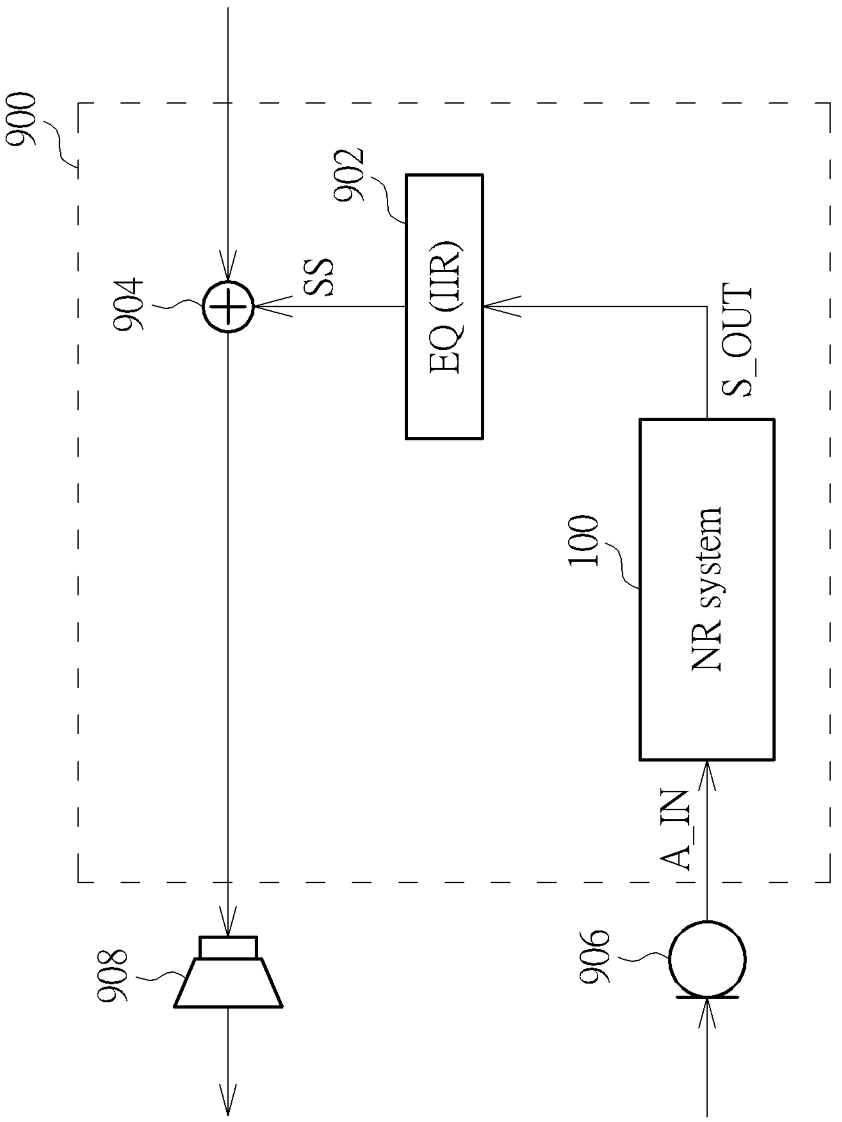
FIG. 9 is a diagram illustrating a sidetone circuit using the NR system shown in FIG. 1 according to an embodiment of the present invention.

FIG. 9 is a diagram illustrating a sidetone circuit using the NR system 100 according to an embodiment of the present invention. The sidetone circuit 900 can be enabled when a user speaks using a handset of user's phone. The sidetone circuit 900 includes the NR system 100, an equalizer (EQ) 902, and a combining circuit (e.g., an adder) 904. An output of a microphone 906 acts as the input signal A_IN of the NR system 100, and the filter output S_OUT of the NR system 100 acts as an EQ input. The EQ 902 may be implemented using an IIR filter. The EQ 902 is arranged to output a sidetone signal SS to the combining circuit 904, such that an input of a speaker 908 includes the sidetone signal SS. In this way, better communication quality can be achieved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A noise reduction (NR) system comprising:

a finite impulse response (FIR) filter, arranged to perform NR upon a filter input derived from an input signal; and a filter manager circuit, arranged to determine a configuration of a minimum phase filter according to the input signal, and update the FIR filter by the configuration of the minimum phase filter, wherein the filter manager circuit comprises:

an NR filter estimation circuit, arranged to estimate an NR prototype filter according to the input signal; and a minimum phase translator circuit, arranged to approach the NR prototype filter in a minimum phase manner, wherein the configuration of the minimum phase filter is derived from an output of the minimum phase translator circuit.

2. The NR system of claim 1, wherein the FIR filter is a hardware filter.

3. The NR system of claim 1, wherein the NR prototype filter is a time-domain NR prototype filter.

4. The NR system of claim 3, wherein the NR filter estimation circuit comprises:

a filter bank analysis circuit, arranged to convert the input signal from a time domain to a frequency domain;

a gain calculation circuit, arranged to generate a frequency-domain NR prototype filter by estimating background noise statistics and computing weights of a plurality of frequency bands according to an output of the filter bank analysis circuit; and a filter bank synthesis circuit, arranged to convert the frequency-domain NR prototype filter into the time-domain NR prototype filter.

5. The NR system of claim 1, wherein the NR prototype filter is a frequency-domain NR prototype filter.

6. The NR system of claim 5, wherein the NR filter estimation circuit comprises:

a filter bank analysis circuit, arranged to convert the input signal from a time domain to a frequency domain; and a gain calculation circuit, arranged to generate the frequency-domain NR prototype filter by estimating background noise statistics and computing weights of a plurality of frequency bands according to an output of the filter bank analysis circuit; and the filter manager circuit further comprises:

a filter bank synthesis circuit, arranged to convert the output of the minimum phase translator circuit from the frequency domain to the time domain.

7. The NR system of claim 1, wherein the NR system is included in a true wireless headset, a hearing aids device, a personal sound amplification product (PSAP), a wireless microphone, or a sidetone circuit.

8. A noise reduction (NR) method, comprising:

performing, by a finite impulse response (FIR) filter, NR upon an input signal;

determining a configuration of a minimum phase filter according to the input signal; and updating the FIR filter by the configuration of the minimum phase filter;

wherein determining the configuration of the minimum phase filter according to the input signal comprises:

estimating an NR prototype filter according to the input signal; and deriving the configuration of the minimum phase filter for approaching the NR prototype filter in a minimum phase manner.

9. The NR method of claim 8, wherein the FIR filter is a hardware filter.

10. The NR method of claim 8, wherein the NR prototype filter is a time-domain NR prototype filter.

11. The NR method of claim 10, wherein estimating the NR prototype filter according to the input signal comprises:

performing filter bank analysis to convert the input signal from a time domain to a frequency domain;

generating a frequency-domain NR prototype filter by estimating background noise statistics and computing weights of a plurality of frequency bands according to an output of the filter bank analysis; and performing filter bank synthesis to convert the frequency-domain NR prototype filter into the time-domain NR prototype filter.

12. The NR method of claim 8, wherein the NR prototype filter is a frequency-domain NR prototype filter.

13. The NR method of claim 12, wherein estimating the NR prototype filter according to the input signal comprises:

performing filter bank analysis to convert the input signal from a time domain to a frequency domain; and generating the frequency-domain NR prototype filter by estimating background noise statistics and computing weights of a plurality of frequency bands according to an output of the filter bank analysis; and determining the configuration of the minimum phase filter according to the input signal further comprises:

performing filter bank synthesis to convert the configuration of the minimum phase filter from the frequency domain to the time domain.

14. The NR method of claim 8, wherein the NR method is employed by a true wireless headset, a hearing aids device, a personal sound amplification product (PSAP), a wireless microphone, or a sidetone circuit.

* * * * *